US005481635A

United States Patent [19]

Arroyo et al.

[11] Patent Number: 5,481,635

[45] Date of Patent: Jan. 2, 1996

[54] COMPOSITE DISTRIBUTION CABLE

[75] Inventors: Candido J. Arroyo, Lithonia; David S. Hancock, Roswell; Richard L. Knight, Cumming, all of Ga.

[73] Assignee: AT&T Corp., Murray Hill, N.J.

[21] Appl. No.: 330,499

[22] Filed: Oct. 28, 1994

[51] Int. Cl.[6] .......... G02B 6/44

[52] U.S. Cl. .......... 385/103

[58] Field of Search .......... 385/100–103, 385/147

[56] References Cited

U.S. PATENT DOCUMENTS

| | | | |
|---|---|---|---|
| 4,158,478 | 6/1979 | D'Auria et al. | 350/96.23 |
| 4,272,155 | 6/1981 | Slaughter | 350/96.23 |
| 4,375,313 | 3/1983 | Anderson et al. | 350/96.23 |
| 4,392,714 | 7/1983 | Brüggendieck et al. | 350/96.23 |
| 4,695,127 | 9/1987 | Ohlhaber et al. | 350/96.23 |
| 4,852,965 | 8/1989 | Mullin et al. | 350/96.23 |
| 4,913,517 | 4/1990 | Arroyo et al. | 350/96.23 |
| 4,993,805 | 2/1991 | Abe et al. | 350/96.23 |
| 5,020,875 | 6/1991 | Arroyo et al. | 350/96.23 |

*Primary Examiner*—Akm E. Ullah

[57] ABSTRACT

A composite distribution cable for connection between a customer's premises and a network interface unit bas a broadband signal conducting means, a power conducting means, and a narrow band signal conducting means surrounded by a metallic sheath. Water blocking means within the cable is adapted to fill the voids between the conducting members and the sheath upon contact with water or other liquid.

6 Claims, 2 Drawing Sheets

COMPOSITE DISTRIBUTION CABLE

FIELD OF INVENTION

The invention relates to a communications cable and, more particularly, to a composite distribution cable for both broadband signals, narrow band signals, and power distribution.

BACKGROUND OF THE INVENTION

Broadband communication systems comprise, in a typical configuration, a signal receiving station, such as a satellite dish antenna whose output is applied via optical fiber cables to a central office. Customarily, the central office (CO) has two or three outputs, one output being broadband signals in a frequency range of 50 to 600 Mhz for video and other broadband signals, for example, another output being narrow band, such as, for example, 5 to 30 Mhz for voice communications, a second broadband output of, for example, 500 to 750 Mhz. The actual frequencies and ranges depend upon the particular signals which each system is called upon to handle, and those given here are by way of example only. Signals in each of the three signal frequency ranges are usually transmitted over optical fiber cables to one or more nodes, in series or in parallel, each of which is located in the general vicinity of the region of end use. At each node the optical signals are convened to electrical signals and applied to a broadband coaxial cable trunk. The coaxial cable trunk is then tapped, at different points therealong, and the signals thereon are applied through a coaxial cable to a Network Interface Unit (NIU) which feeds the signals via distribution cables to the customer's premises. In present day systems, it is often necessary to amplify the signals on the coaxial cable received from the node and from the tap by the NIU, which requires a source of power for the amplifiers, and such a source is also required for other functions of the NIU. The AC power in the present day systems for broadband only networks is delivered via the coaxial cables. The power is supplied by power supplies connected to commercial power sources. The new networks will carry signals for a variety or services; i.e., broadband, narrowband, pots, etc. These new requirements created a need to develop a different approach to providing power to the various systems. This is due to the increased power consumption of the NIU and the current limitation of fifteen (15) amperes for most of the existing network components. Adding a parallel conductor either coax or copper to carry the additional power required is an expensive alternative but would resolve the power issues. A more cost effective and reliable approach is to install one cable capable of providing all electrical paths required by each component for proper network operation. This solution will also provide a network that is less susceptible to noise (hum modulation) caused by the AC power.

In such systems as described, it is generally highly desirable that the individual customers be able to communicate with the central office in order to request particular programming of, in particular, the video signal, such as pay TV or various types of subscriber add-ons ancillary to the broadband signal capability. To this end, the central office may have a manager module to which subscriber requests, usually narrow band signals, are directed, and a service module under command of the management modules for directing the appropriate programming or other requested services to the customer through the system. Thus, it is necessary in such a system that, in addition to the broadband and narrow band signals carried to the tap-off point, from the central office, that that portion of the system which extends from the tap-off through any amplifiers to the NIU and to the customer premises have a power capability and a voice capability. It is also desirable that there be test means extending back to the central offices for testing, for example, continuity throughout the system. Such a requirement is satisfied in present practice by separate cabling and wiring for each of the different needs, i.e., power, voice, and broadband. This is, relatively speaking, costly from an installation and material standpoint, and does not necessarily solve the aforementioned power supply problems.

SUMMARY OF THE INVENTION

The present invention is directed to, and represents, a solution to the various problems and deficiencies of prior art systems as enumerated and discussed in the foregoing.

In a preferred embodiment, the invention comprises a composite coaxial cable structure for connection from the node to the tap, from the tap to between the NIU and the customer premises. The cable of the invention may be regarded as a module which, in new or initial hook-ups, forms the connection from the node to the tap, from the tap to the NIU, and between the NIU and the customer premises, and which, in rewired or other existing systems, can replace all of the existing separate wiring configurations discussed heretofore.

The basic structure of the cable of the invention is a broadband coaxial cable having a core member comprising a central conductor encased in a suitable insulating material having an outer surface and which is surrounded by a metallic member which is, in turn, encased in a suitable insulating jacket. Externally of the metallic member, but located internally of the insulating jacket, preferably in contact therewith, is a pair of, for example, ten gauge shielded power cables which extend longitudinally and substantially, but not necessarily, parallel to the center conductor of the coaxial cable. Also contained within the jacket but externally of the metallic member is a twisted pair of insulated voice communication wires of, for example, twenty-two gauge, which also extend longitudinally of the cable. In order to avoid any possible interference or crosstalk with the power cables, the twisted pair is preferably located diametrically opposite the power cables, i.e., on the opposite side of the cable axis, or of the center conductor. The inclusion of both power cables and twisted pairs within the jacket but exterior to the metallic member encasing the center conductor necessarily creates voids through which water may flow, wreaking havoc on the proper functioning of the cable. To this end, the empty spaces or voids contain filamentary water blocking material preferably in the form of strands of yarn impregnated with a superabsorbent material. Such a water blocking yarn thus treated has the property, when exposed to water or other moisture, of swelling to several times its original size without being dissolved in water, and thereby blocking any water passages created by the voids.

In another embodiment of the invention, the core member comprises a central conductor encased in a suitable insulating material, and both the shielded power cables and the twisted pair extend along the length of the core member in contact with the outer surface of the insulating material, and the assembly is surrounded by a metallic member which is, in turn, surrounded by the insulating and protective jacket. The voids created between the insulating material surrounding the central conductor and the metallic member contain filamentary water blocking material as in the first embodiment.

In still another embodiment of the invention, the core member comprises a central conductor encased in a suitable insulating material whose outer surface is in contact with and surrounded by a metallic member. Externally of the metallic member and in contact therewith, are the shielded power cables and the insulated twisted pair, coextensive with the center conductor, and the assembly of core, twisted pair, and power cables is encased in a second metallic member which is, in turn, encased in an insulating and protective jacket. Any voids within the space between the two metallic members contain filamentary water blocking material in the same configuration as the first and second embodiments of the invention.

The cable of the invention is intended for use in virtually any portion of the system between the node and the customer premises, and insures adequate power transmission to power any amplifiers and other power consuming components of the system. In addition it insures that adequate voice or other narrow band communication exists between the customer premises and the node, and to the central office. Inclusion of the twisted pair as voice and test leads makes it possible to test for any breaks or discontinuities in the cable as opposed to separate twisted pairs external to the cable.

Another advantage of the cable of the invention is the simplicity of installation and the elimination of separate wiring for cable testing and voice, which create additional costs. Elimination of even nominal extra cost can result in enormous savings where it is realized that millions of such installations are performed each year.

The numerous features and advantages of the present invention will be readily apparent from the following detailed description read in conjunction with the accompanying drawings.

DETAILED DESCRIPTION

Figure 1:
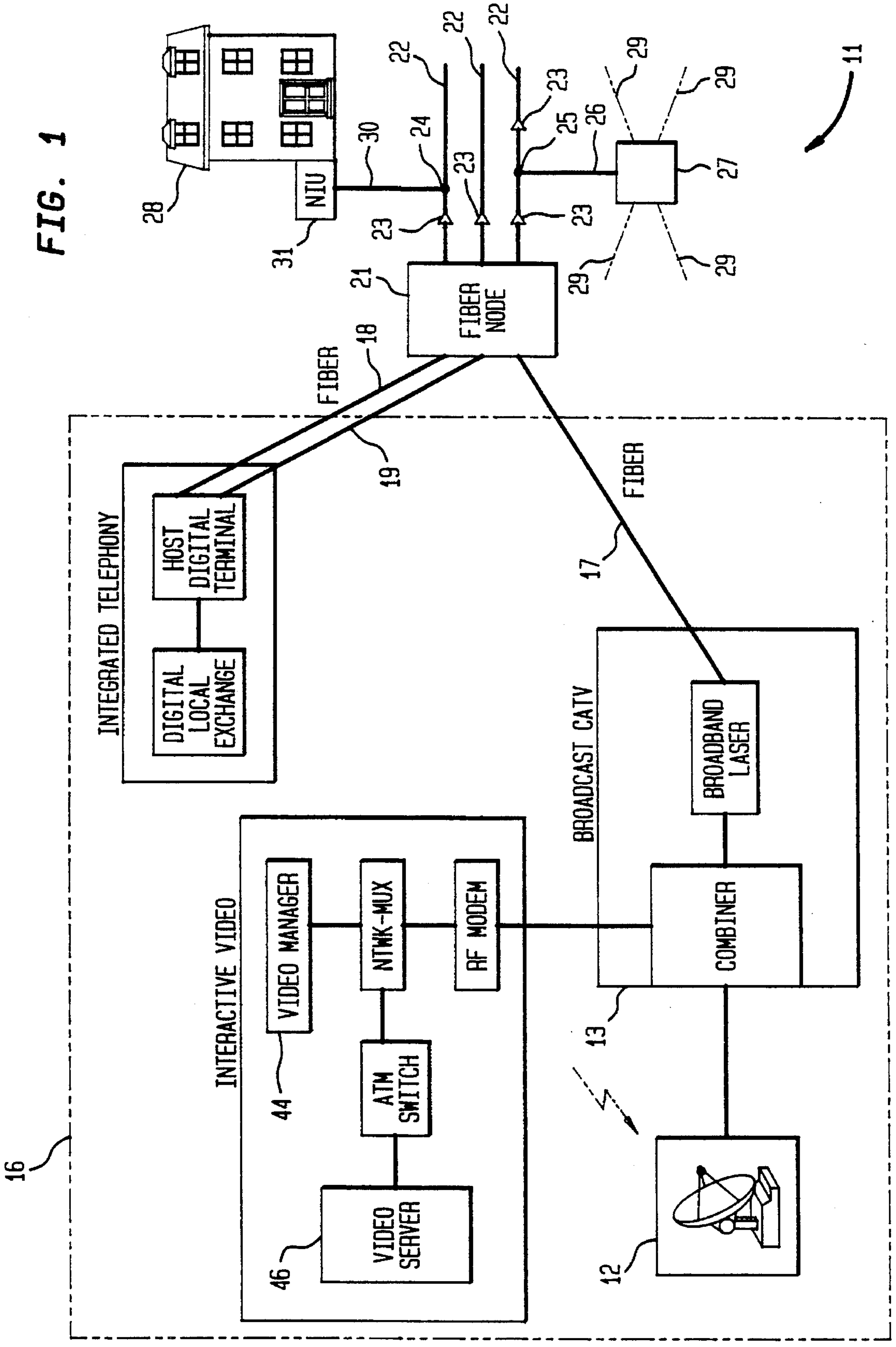
FIG. 1 is a block diagram of a typical broadband signal distribution system.

In FIG. 1 there is shown a block diagram of a typical broadband/narrow band signal distribution system 11 for distributing broadband signals received from, for example, a satellite, as well as narrow band telephone and data signals. System 11 comprises a dish antenna 12 and receiving station 13 which converts the received signals to optical signals within a central office (CO) 16, shown in dashed outline. The output of CO 16 can comprise, for example, signals in the 50–600 Mhz range for video and ancillary signals transmitted over optical fiber cable 17, signals in the 5–30 Mhz range for voice signals, transmitted over optical fiber cable 18, and, if necessary or desired, signals in the 500–750 Mhz range for data and the like, transmitted over optical fiber cable 19. The signals on cables 17, 18 and 19 are transmitted to a plurality of nodes, one of which, node 21, is shown. The nodes are located in the general direction, if not the actual vicinity, of a group or groups of customers to be serviced. The node 21 performs the function of converting the optical signals received from cables 17, 18 and 19 into electrical signals which are transmitted out on a broadband coaxial cables 22. Depending upon their length, and hence their signal attenuation, cables 22 have positioned, at spaced intervals, one or more signal amplifiers 23 which amplify and generally refurbish or rejuvenate the signals on cables 22. At points along cables 22 are taps, two of which, taps 24 and 25, are shown. As thus far described, cables 22 carry broadband and voice signals while power for amplifiers 23,23 and nodes 21,21 is generally supplied by separate power lines from a suitable source or sources, not shown. Cables 22 preferably embody the features and principles of the present invention as will be discussed more fully hereinafter.

At tap 25 the signals on cable 22 are tapped off and transmitted over coaxial cable 26, which embodies the features and principles of the present invention, to a Network Interface Unit (NIU) 27. NIU 27 performs the functions of separating and, if necessary, amplifying, the signals from tap 24 and routing the signals thus separated to the appropriate customer's premises via a plurality of cables 29,29 each of which embodies the principles and features of the present invention, and which is discussed in connection with FIG. 1. It is also possible for an NIU to be attached directly to a customer's premises, as shown in NIU 31 attached to building 28 and connected via cable 30 to tap 24.

It is to be understood that the system of FIG. 1 is intended to be merely illustrative of a system which utilizes the present invention, there being a wide range of system configurations possible for which the cable of the present invention is useful.

Figure 2:
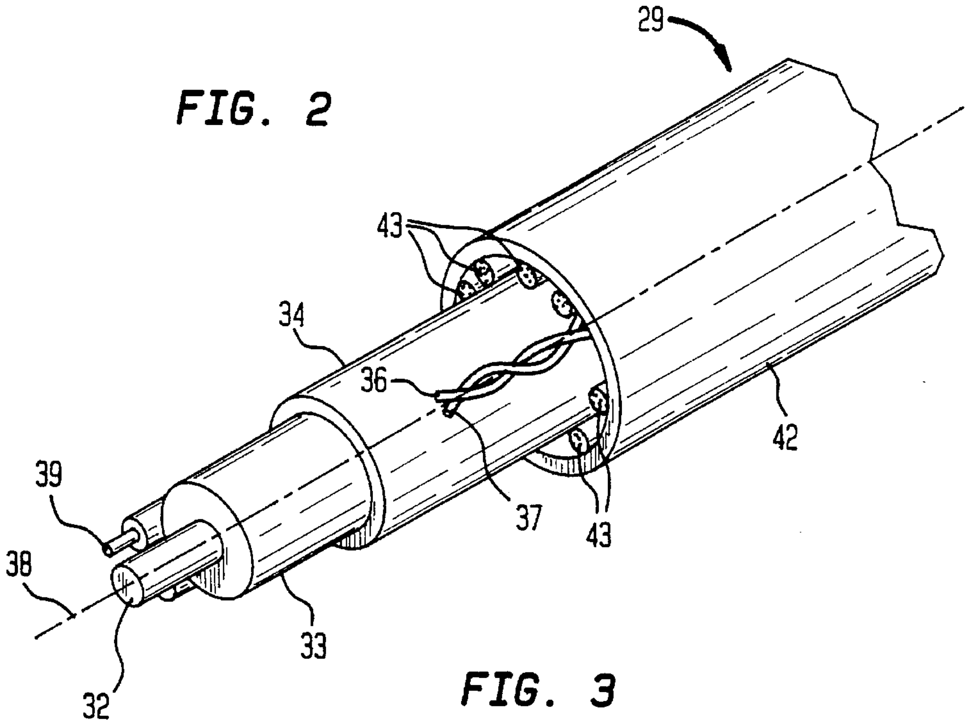
FIG. 2 is a perspective partially cutaway view of the composite distribution cable of the invention.

In FIG. 2 there is shown in perspective the cable 29 of the invention. It is to be understood that cables 22 are preferably the same as cable 29, hence, the following description applies to them also, as well as to the cables 26 and 30. Cable 29 comprises a central core member for carrying broadband signals which has a central conductor 32 surrounded by and encased in a cylindrical dielectric member 33 of suitable material such as, for example, polyester foam. Member 33 is in turn encased in a metallic sleeve 34 which preferably is a metallic mesh material. A twisted pair of insulated wires 36 and 37 is positioned adjacent the surface of sleeve 34 and extends along the length of the cable 29 preferably parallel to the axis 38 thereof. On the opposite side of the axis 38, diametrically opposite the twisted pair 36,37 is a pair of insulated, preferably shielded, power cables or wires 39,41, and only 39 being visible in FIG. 2. Wires 39 and 41 are positioned diametrically opposite the twisted pair 36,37 to minimizing electromagnetic interference by the power wires on the twisted pair. Wires 39 and 41 extend longitudinally along the surface of metallic sleeve 34, preferably in contact therewith and parallel to the axis 38 of the cable 29. Surrounding the assembly of the core member, the twisted pair, and the power cables is a jacket 42 of suitable insulating material such as, for example, polyethylene.

Figure 3:
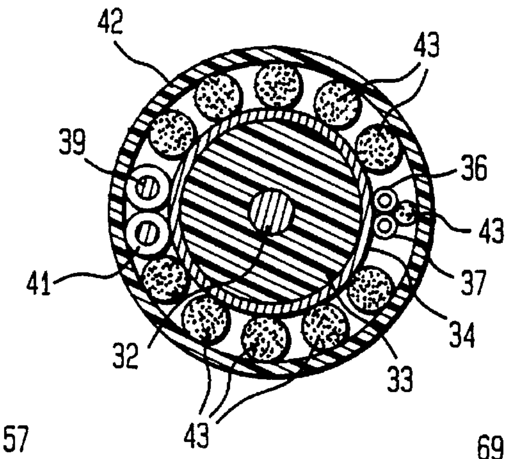
FIG. 3 is a cross-sectional view of the cable of FIG. 2.

As can best be seen in FIG. 3, the inclusion of power wires 39 and 41 and twisted pairs 36,37 within the surrounding jacket 42 creates a considerable gap between the outer surface of the core member, i.e., sleeve 34, and the interior surface of jacket 42. This gap has the effect of creating the pipe for the ingress of water into cable 29 and flow along the length thereof, which can wreak havoc on the proper functioning of cable 29, or on cable 22, especially when these cables are exposed to the elements in any way.

In order that the movement of water into and along the cable be prevented, yarn members 43 are arrayed within the otherwise open space between the surface of member 34 and jacket member 42. Members 43 are preferably made of a water swellable fiber material such as disclosed in U.S. Pat. No. 4,913,517 of Arroyo et al., which is incorporated by reference herein. The material of the yarn members 43 may be "LANSEAL-F®" which has the property of swelling to many times its original diameter when contacted by water. Such a material is of a class of materials known as superabsorbents. Alternatively, the members 43 may be of a suitable yarn material impregnated with a superabsorbent material. Such a material, as discussed in the aforementioned Arroyo et al. patent can be derived from an aqueous solution comprising acrylate polymeric material which combines acrylic acid and sodium acrylate functionalities and water. Other acrylic based include starch-graft polymers and cross-linked glycolate and cellulose esters. These latter polymers derive their super absorbency from carboxylic groups attached to the spine of the polymer. There are various other super absorbent materials which can also be used to impregnate the yarn. The members 43, which extend longitudinally along the length of cable 29, will, when encountered by water, fill the empty spaces and interstices to form a complete blockage to the movement of water along the cable 29. If desired or necessary, some of the members 43 may comprise strength members of, for example, KEVLAR® yarn which has been coated or impregnated with a superabsorbent material.

When connected between the fiber node 21 and the tap 24 or 25 (cable 22), and from the tap 25, for example, to the NIU (cable 26), the cable of the invention as shown in FIGS. 2 and 3 supplies power from the node 21 to the amplifiers 23,23 and to the NIU, such as NIU 27. Alternatively, when the cable is connected between the customer's premises and the NIU 27, the power wires 39 and 41 are connected to the source of power at the customer's premises and conduct such power to the NIU 27. Inasmuch as each of the connected customer premises supplies power to the NIU, failure at one or even several customer premises will not cause the NIU to shut down so long as there is one locale where the power has not failed. The twisted pair 36 and 37 are connected to customer apparatus and form a voice or other narrow band communication channel back through the NIU 27, cable 26 and tap 24 to the central office 16, to a management module 44. By this means the customer is able to request or order certain programming, such, as, for example, a pay TV movie, and the management module 44 directs a service module 46 to supply the requested programming to the customer. The twisted pair 36,37 can also function as a continuity testing circuit and as a communication means for installers working on the system.

Figure 4:
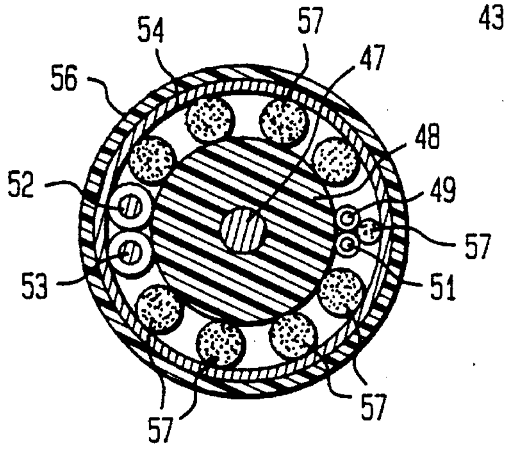
FIG. 4 is a cross-sectional view of a second embodiment of the invention.

In FIG. 4 there is shown a second embodiment of the invention wherein the core member comprises a central conductor 47 encased in a member 48 of suitable insulating material, such as polyester foam. A twisted pair of insulated conductors 49,51 lies along the exterior surface of the core member, in this case, the surface of member 48, and extends along the length of the cable preferably parallel to the axis thereof. Diametrically opposite pair 49,51 and lying on the core member is a pair of insulated, preferably shielded, power conducting wires 52,53 which also extend along the length of the cable preferably parallel to the axis thereof. The assembly of the core member, twisted pair 49,51 and power conducting wires 52 and 53 is encased in a surrounding sheath 54, preferably of a metallic mesh material. Sheath 54 is, in turn, surrounded by and encased in a jacket 56 of suitable insulating material such as polyethylene. The space between the outer surface of the core member and the inner surface of the sheath 54 contains a plurality of water blocking yarn members which are equivalent to members 43,43 described in connection with FIGS. 2 and 3.

Figure 5:
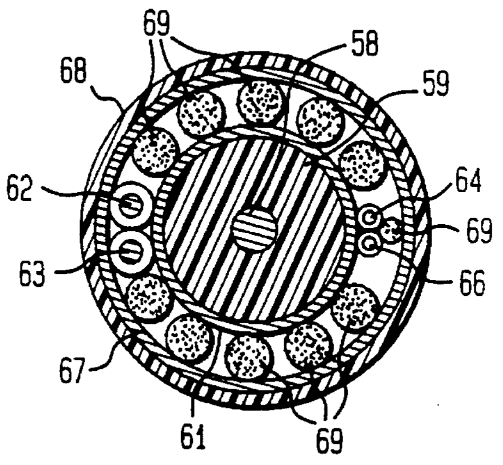
FIG. 5 is a cross-sectional view of a third embodiment of the invention.

FIG. 5 depicts a third embodiment of the invention which in effect represents a combination of the embodiments of FIGS. 3 and 4. In the cable of FIG. 5, the core members comprises a central conductor 58 encased in an insulating member 59 of suitable material and a metallic sheath 61, preferably of a mesh material. Power wires 62 and 63 are disposed along the length of the core member in contact therewith, and twisted pair 64 and 66 are also disposed along the length of the cable preferably in contact with the core member and diametrically opposite power wires 62 and 63. The assembly of the core member and the wires 62,63 and 64,66 is surrounded by a metallic sheath 67 preferably of metallic mesh, which is in turn encased in a jacket 68 of a suitable insulating material. The space between the outer surface of the core member, in this embodiment, the outer surface of sheath 61, and the inner surface of sheath 67, is filled with a plurality of water blocking members 69,69, in the same manner as the embodiments of FIGS. 3 and 4.

The embodiment of the invention shown in FIG. 5 provides shielding between the center conductor and the power wires and twisted pair, and also shielding of the entire cable by means of sheath 67. Sheath 67 also functions to protect the cable assembly from lightning and from rodents, both of which are common problems for outdoor cable.

The cable of the present invention has been shown in several illustrative embodiments as used in one particular type of system. The combined broadband, narrow band, and power capabilities of the composite cable make it potentially useful in a wide variety of systems, and function to reduce material installation costs, as well as the cost and unreliability of separate means tier handling the differing signals and power requirements in any such systems. While it is known in the prior art to combine various signal bearing wires within a single cable, as shown in U.S. Pat. No. 4,755,629, of Beggs et al., the present invention combines groups of conductors having totally different capabilities in a new and useful structure.

The foregoing discussion has been for the purpose of illustrating the principles and features of the present invention as embodied in a compact, economical composite distribution cable. Numerous changes or variations may occur to workers in the an without departure from the spirit and scope of the invention.

We claim:

1. A composite cable for the transmission of electrical signals comprising:

a longitudinally extending core member having a metallic conductor member for transmitting broadband signals encased within an insulating member, said core member having an outer surface and a longitudinal axis:

first and second insulated electrical power conducting members disposed substantially adjacent each other and extending longitudinally along said outer surface;

a twisted pair of individually insulated narrow band signal conductors disposed adjacent the outer surface of said core member on the other side of the axis thereof from said power conducting members and extending longitudinally therealong;

a jacket of insulating material surrounding said core member, said power conducting members and said twisted pair, said jacket being spaced from said core member;

means for preventing the flow of water into and through at least a portion of the space between said core member and said jacket, said means comprising one or more discrete superabsorbent members located in the space between said core member and said jacket and extending along the length of said cable;

a first metallic sheath member surrounding said insulating member in contact therewith said cable further comprising a second metallic sheath member surrounding said core member and spaced therefrom, said power conducting members, said twisted pair, and said superabsorbent members being situated in the space between said first and second metallic sheath members.

2. A composite cable as claimed in claim 1 wherein each of said superabsorbent members comprises a fibrous member having superabsorbent properties.

3. A composite cable as claimed in claim 2 wherein said fibrous member comprises a yarn material treated with a superabsorbent material.

4. A composite cable as claimed in claim 1 wherein said first metallic member sheath comprises a metallic mesh.

5. A composite cable as claimed in claim 1 wherein said second metallic member sheath comprises a metallic mesh.

6. A composite cable as claimed in claim 1 wherein both said first and second metallic sheath members comprise metallic mesh.

* * * * *